United States Patent
Hummer et al.

[11] 3,752,243
[45] Aug. 14, 1973

[54] ROLLER CUTTER ASSEMBLY WITH IMPROVED BEARING SEAL RING

[75] Inventors: Herbert B. Hummer; Donald P. Jackson; Rex E. Hall, all of Kalamazoo, Mich.

[73] Assignee: Durametallic Corporation, Kalamazoo, Mich.

[22] Filed: Sept. 20, 1971

[21] Appl. No.: 181,820

[52] U.S. Cl.................... 175/364, 175/372, 277/92, 277/96 R, 308/8.2
[51] Int. Cl.............................................. E21b 9/08
[58] Field of Search............ 175/371, 372, 361–364; 299/86; 277/92, 96 R; 308/8.2

[56] References Cited
UNITED STATES PATENTS
| | | | |
|---|---|---|---|
| 3,216,513 | 11/1965 | Robbins et al.................. | 299/86 X |
| 3,086,782 | 4/1963 | Peickii et al. ................. | 277/96 R X |
| 3,679,009 | 7/1972 | Goodfellow..................... | 175/372 X |
| 3,572,452 | 3/1971 | Winberg ............................ | 175/371 |

*Primary Examiner*—Ernest R. Purser
*Attorney*—Woodham, Blanchard & Flynn

[57] ABSTRACT

An improved seal assembly, and a method of manufacturing same, for use in a rock cutter assembly of a tunneling machine. The cutter assembly includes a rotary cutter rotatably mounted on a frame by anti-friction bearings. Seal means coact between the frame and the cutter for preventing undesirable materials from contacting the bearings. The seal means includes a seal ring resiliently urged into sliding sealing engagement with the outer race of the anti-friction bearing. The seal ring is provided with a thin ceramic layer defining the sealing face thereof. The end surface of the bearing race is lapped as a seal face by a special lapping tool which comprises an annular plate-like member having an annular ring-like lapping surface on the axial face thereof adjacent the periphery of the tool. The lapping surface surrounds an annular groove formed in the tool.

3 Claims, 5 Drawing Figures

Patented Aug. 14, 1973

INVENTORS
HERBERT B. HUMMER
DONALD P. JACKSON
REX E. HALL
BY Woodhams, Blanchard & Flynn
ATTORNEYS

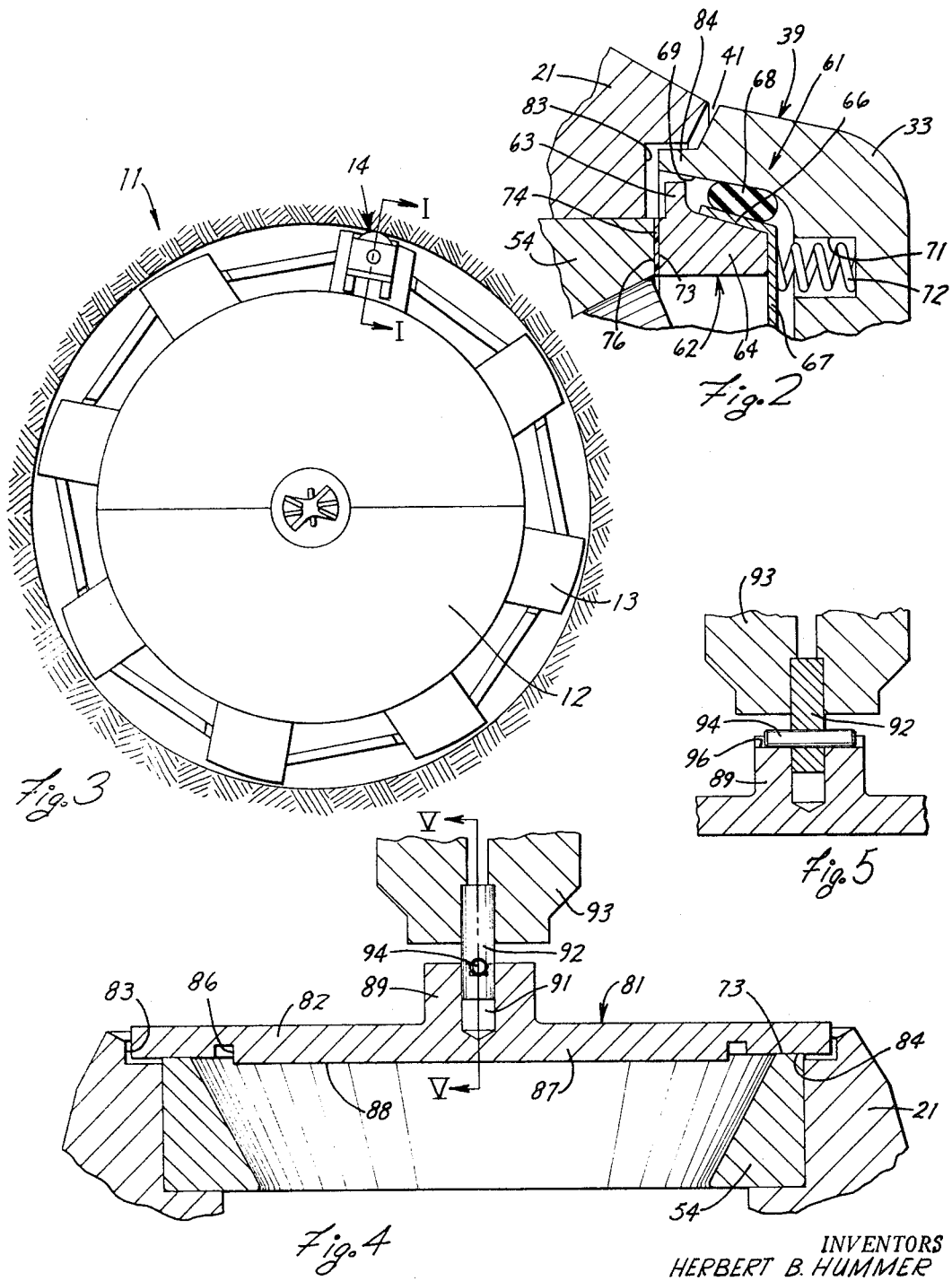

ROLLER CUTTER ASSEMBLY WITH IMPROVED BEARING SEAL RING

FIELD OF THE INVENTION

This invention relates to a cutter assembly for a tunneling machine and, in particular, to an improved seal for said cutter assembly and a method of manufacturing said seal.

BACKGROUND OF THE INVENTION

Cutter assemblies as provided on tunneling machines have long experienced bearing problems due to the highly abrasive or corrosive materials encountered by the cutter assembly during operation. Various types of seal devices and shrouds have been used in an attempt to prevent the abrasive or contaminating materials, such as water or grit, from coming into contact with the bearings. However, most of these prior known seal devices have, at best, been only partially effective in preventing such contact. Further, many of the prior seal structures have been extremely complex and costly, or have required undesirable maintenance and repair, thereby making their use inconvenient and often expensive.

Accordingly, it is a primary object of the present invention to provide an improved seal structure for use in a cutter assembly mounted on a tunneling machine, which seal assembly overcomes the above-mentioned disadvantages.

Particularly, it is an object of the present invention to provide an improved seal assembly, as aforesaid, which is capable of providing an effective rotating sliding seal for preventing abrasive or corrosive materials from coming into contact with the anti-friction bearings which rotatably support the cutter.

It is a further object of the present invention to provide an improved seal assembly for a cutter, as aforesaid, wherein an annular seal ring is resiliently urged into rotatable sliding and sealing engagement with a further annular seal surface formed on the outer race of the anti-friction bearing, and wherein the annular seal ring is provided with a ceramic layer on the seal face thereof disposed in rotatable sliding engagement with the seal face formed on the metallic outer race for providing a fluid tight, long wearing, sliding seal.

It is also an object of the present invention to provide an improved lapping tool designed for coaction with the outer race of the bearing for permitting the axial end face thereof to be lapped to form a suitable seal face thereon for coaction with the ceramic coated seal ring, which lapping tool permits the lapping of the outer race when positioned on the cutter with the bearing roller cage removed to insure formation of a seal face having the necessary dimensional and surface finish tolerances.

Another object of the present invention is to provide an improved lapping tool, as aforesaid, which can be used for relapping the seal face on the outer bearing race when the tunneling machine is located in the field and immediate repair of the seal assembly is necessary.

These and other objects of the present invention will be apparent to persons acquainted with devices of this type upon reading the following specification and inspecting the accompanying drawings.

BRIEF DESCRIPTION OF THE DRAWINGS

FIG. 2 is an enlarged, fragmentary sectional view of the seal assembly illustrated in FIG. 1.

FIG. 3 illustrates therein a front end view of the rotary boring head of a conventional tunneling machine.

FIG. 4 illustrates therein the improved lapping tool of the present invention and the manner in which the same coacts with the outer bearing race for lapping a seal face thereon.

FIG. 5 is a fragmentary sectional view along the line V—V of FIG. 4.

Figure 1:
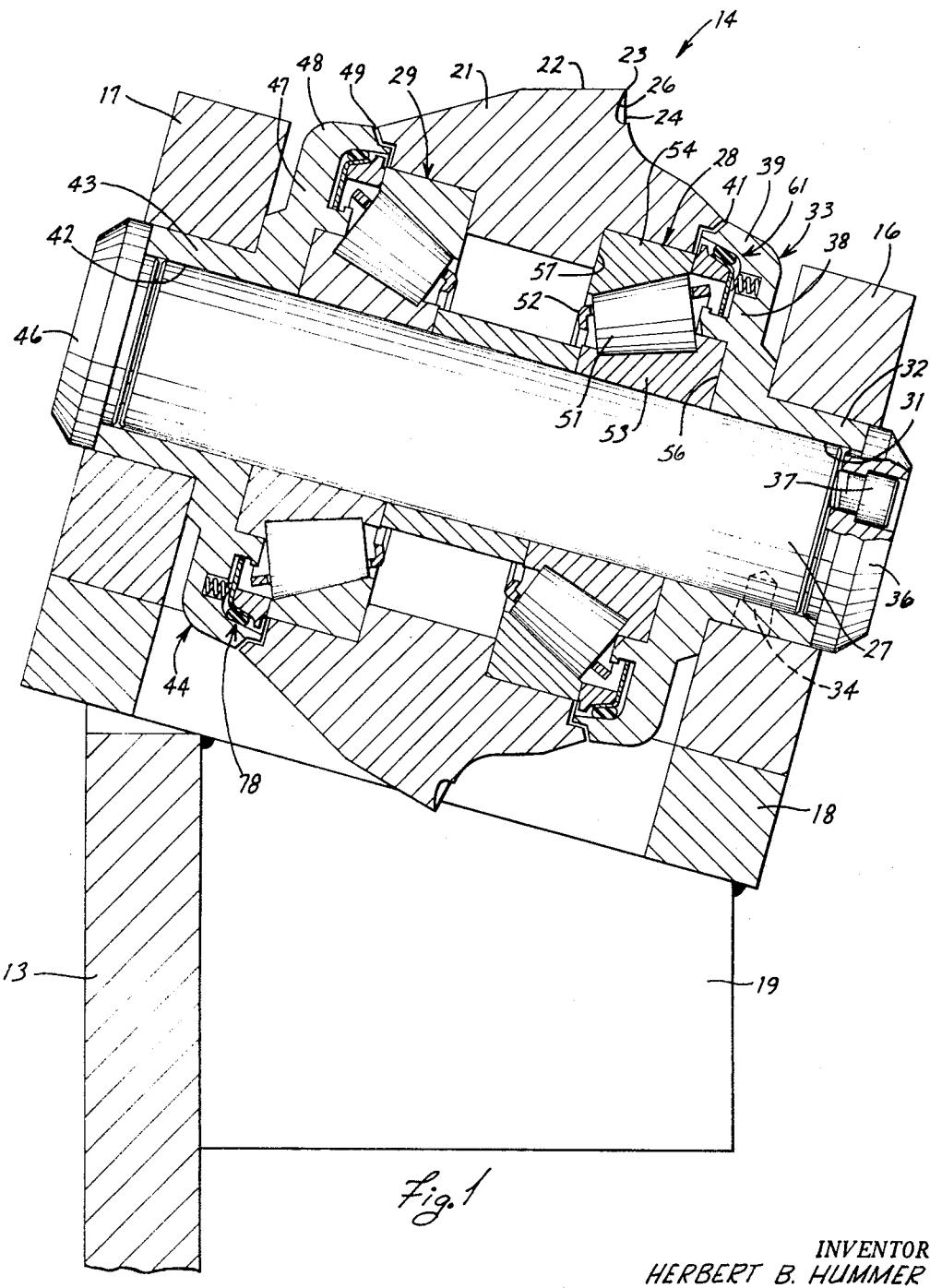
FIG. 1 is a sectional view taken substantially along the line I—I of FIG. 3 and illustrating therein a cutter assembly constructed according to the present invention.

Certain terminology will be used in the following description for convenience in reference only. The words "upwardly", "downwardly", "rightwardly" and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the present invention are met by providing a cutter assembly having a rock cutter rotatably supported on a frame by anti-friction bearing means which coact with a seal ring for preventing contamininating or corrosive materials from contacting the bearing elements. The seal ring is nonrotatably connected to the frame. The seal ring has a thin ceramic seal face formed on one axial end thereof and is resiliently urged toward the bearing means to cause the ceramic seal face to be urged into rotatable shifting and sealing engagement with a further seal face formed on the axial end of the outer bearing race. The seal face on the bearing race is formed by a special lapping tool which comprises a circular plate-like member having an annular ring-like lapping surface on one axial face thereof, which lapping surface is disposed in surrounding relationship to an annular groove. The lapping plate permits lapping the seal face on the bearing race when the latter is fixedly mounted within the rock cutter and the bearing roller case is removed. The lapping tool is adapted to be driven from a conventional tool holder, such as a rotary drill press, or the lapping tool can be manually positioned on and gyrated relative to the outer bearing race for finishing the end surface thereof.

DETAILED DESCRIPTION

In the embodiment of the invention disclosed in the drawings, FIG. 3 illustrates a boring head 11 of a rotary tunneling machine for continuously effecting a tunnel boring operation. The boring head 11 is of conventional construction and includes a central disk or plate 12 which is rotatable about a substantially horizontal axis and has a plurality of circumferentially spaced cutter arms 13 extending radially therefrom, which cutter arms each carry a cutter assembly 14, only one of which is shown in FIG. 1 for purposes of illustration. This structure, as described above, is substantially conventional and may be as illustrated in greater detail in U. S. Pat. Nos. 3 139 148, 3 232 670 and 3 237 990.

The cutter assembly 14, as illustrated in FIG. 1, includes a frame which comprises a pair of removable mounting blocks 16 and 17 connected to a substantially hollow, rectangular support member 18. The mounting blocks 16 and 17 are removably connected to the support member 18 by any conventional means, such as screws (not shown). The support member 18 is disposed between and fixedly connected to a pair of spaced flanges 19, which flanges are fixedly secured to the cutter arm 13, whereby the cutter assembly 14 is thus radially spaced from the rotational axis of the boring head 11.

Considering now in greater detail the structure of the cutter assembly 14, same includes a conventional annular rock cutter 21 which is generally of frustoconical cross section and has an inclined retreating face 22 leading to a cutting tip 23 at the periphery of the cutter. The advance faces of the roller cutter 21 are shown as terminating at their outer end portions into generally arcuate recesses 24 leading to a slightly forwardly pitched face 26, and cooperating with the retreating face 22 to define the cutting tip or periphery 23.

The cutter 21 is supported upon a shaft 27 by a pair of conventional anti-friction besrings 28 and 29, which bearings are disposed in oppositely facing axial directions. The bearings 28 and 29 comprise conventional tapered roller bearings for transmitting the radial and axial thrust loads from the cutter to the stationary frame structure.

One end of the shaft 27 extends into a bore 31 formed in the hub portion 32 of an annular carrier or housing member 33. A suitable key 34 nonrotatably connects the shaft 27 to the carrier member 33. The carrier member 33 is also nonrotatably seated within and secured to the mounting block 16. The end of the bore 31 is closed by a suitable annular cup 36, which cap is disposed in abutting engagement with the end of the hub portion 32 and is fixedly connected to the adjacent end of the shaft 27 by any conventional means, such as a screw 37.

The carrier member 33 has a radially extending flange portion 38 and an axially extending annular flange 39 fixedly connected to the radial flange 38 adjacent the radially outer edge thereof. The axial flange 39 axially extends toward and has a lip portion 84 which extends into an annular recess 83 formed in the cutter 21 so that a small annular clearance space 41 is defined therebetween, which clearance space has a substantially L-shaped cross section.

The other end of the shaft 27 is similarly disposed within a bore 42 formed in a hub portion 43 of a further annular carrier member or housing 44, which member 44 is substantially identical to but disposed axially opposite the annular carrier member 33. The carrier member 44 is also fixedly connected to the shaft 27 by any suitable means, such as a key, and a further end cap 46 is disposed in abutting engagement with the end of the hub portion 43 and is fixedly connected to the shaft 27 by any suitable means, such as a further screw similar to the screw 37. The annular carrier 44 also includes radial and axial flanges 47 and 48, with the annular axial flange 48 having the free edge thereof disposed closely adjacent but spaced from the other axial end of the cutter 21 to define a narrow annular clearance space 49 therebetween. While the clearance spaces 41 and 49 have been exaggerated in the drawings for purposes of illustration, it should be noted that these clearance spaces are preferably made as small as possible while still enabling free rotation of the cutter 21.

Considering now the anti-friction bearing 28, same includes a plurality of conventional bearing elements 51, here tapered rollers, confined within a conventional cage 52 and disposed for rolling engagement with the inner and outer races 53 and 54, respectively. The inner race 53 is suitably nonrotatably connected to the shaft 27, as by means of a press fit, and is disposed so that the outer axial end face thereof is in abutting engagement with a thrust surface 56 formed on the carrier member 33. In a similar manner the outer race 54 is fixedly connected to the cutter 21, as by a press fit, and has the inner end face thereof disposed in abutting engagement with a thrust surface 57 formed on the cutter 21.

The other anti-friction bearing 29 is identical to the antifriction bearing 28 and has the inner and outer races thereof respectively fixedly connected to the shaft 27 and the cutter 21 in the same manner described above relative the the bearing 28 except that he races of the bearing 29 are disposed for transmission of thrust in the opposite direction from the races of the bearing 28.

To prevent abrasive, corrosive and/or contaminating materials from passing through the clearance space 41 into contact with the anti-friction bearing 28, the cutter assembly 14 is provided with an improved seal means 61 for isolating the bearing 28 from the surrounding environment. The seal means 61 includes an annular seal ring 62 disposed adjacent to and closely surrounded by the annular axial flange 39. The seal ring 62 (FIG. 2) specifically includes a radially outwardly extending annular flange 63 which extends toward, but is spaced a small distance from, the internal tapered wall 69 of the axial flange 39. The seal ring 62 also includes an annular base portion 64 which has a tapered longitudinal cross-section and has a substantially conical outer peripheral surface 65. The base portion 64 of seal ring 62 is seated against a plate-like retainer 67 which includes a conical flange 66 adjacent its outer edge, said flange surrounding and snugly engaging the external conical surface 65. A conventional elastomeric resilient O-ring 68 is resiliently compressed between the conical flange 66 and the surrounding internal wall 69 for creating a sealed relationship therebetween and for substantially nonrotatably securing the seal ring 62 relative to the annular carrier member 33. The flange 63 retains the O-ring 68 in position and prevents same from extruding outwardly into the space 41.

The annular carrier member 33 is provided with a plurality of bores 71 formed therein in circumferentially spaced relation relative to the longitudinal axis of the shaft 27. Each bore 71 has a conventional compression spring 72 disposed therein, which spring 72 has one end thereof in engagement with the retainer member 67 to resiliently urge the annular seal ring 62 into rotatable sliding and sealing engagement with the annular end face 73 of the outer bearing race 54. The annular seal ring 62 is provided with a ceramic coating 74 securely bonded to the axial end face thereof, which ceramic layer 74 defines a front seal face 76 which is disposed in rotatable and sliding sealing engagement with the seal face 73 on the bearing race 54. The outer bearing race 54 is, as is conventional, constructed of metal and thus the rotatable sliding and sealing engagement between the seal faces 73 and 76 is achieved due to the coaction between the cooperating ceramic and metal faces. The ceramic layer 74 preferably has a depth (that is, a thickness in the axial direction) of approximately 0.015 inch, with the thickness of the ceramic layer preferably being within the range of between 0.010 inch and 0.020 inch.

In a similar manner a further seal means 78 is disposed for coaction with the outer race of the other anti-friction bearing 29 for preventing contaminating, abrasive and/or corrosive materials from passing through the space 49 into contact with the anti-friction bearing 29. The seal means 78 is identical to the seal means 61 described above and thus further description thereof is not believed necessAry.

Since the seal ring 62 has its seal face 76 disposed in rotatable sliding and sealing engagement with the end face 73 of the outer bearing race 54, it is essential that the end face 73 be absolutely flat to insure that a proper seal is obtained between the faces 73 and 76. Further, the flatness of the face 73 must be present after the outer race 54 has been press fitted into the cutter 21. Since press fitting of the outer race 54 into the cutter 21 generally results in at least some minute distortion of the bearing race, it was discovered that a fluid-tight seal between the faces 73 and 76 could be achieved only by lapping the face 73 after the bearing race 54 has been press fitted into the cutter 21.

Accordingly, to permit lapping of the seal face 73 on the end of the outer bearing race 54, there is provided a special lapping tool 81 (FIGS. 4 and 5) for lapping the face 73 to insure flatness thereof after the race 54 has been press fitted into the cutter 21. The lapping tool 81 comprises an annular plate-like member 82 which has a maximum outer diameter slightly less than the diameter of the annular recess 83 formed in the cutter 21 to enable the lapping tool 81 to be moved into engagement with the end face 73. The tool 81 is provided with an annular ring-like lapping surface 84 on the axial face thereof, which lapping surface 84 is bounded at its outer edge by the outer periphery of the plate-like member 82, and is bounded at its inner edge by an annular recess or groove 86.

The plate-like member 82 includes an annular center portion 87 which is defined within the annular groove 86 and has an axial thickness greater than the axial thickness of the plate adjacent the lapping surface 84 so that the front face 88 of the center portion 87 is disposed axially forwardly of the annular lapping surface 84.

An annular hub 89 is fixedly, here integrally, connected to and extends axially rearwardly from the annular center portion 87 and is provided with a recess or bore 91 therein for slideably guiding and receiving therein one end of a drive shaft 92. The drive shaft 92 is adapted to be fixedly clampingly engaged within a conventional tool holder or chuck 93, such as the chuck of a conventional drill press. The drive shaft 92 has a transverse pin 94 fixedly connected thereto and extending radially therefrom, which transverse pin 94 is adapted to be disposed within a radial slot 96 formed in the upper end of the hub 89 for permitting the lapping tool 81 to be rotatably driven whenever the chuck 93 is rotated, thereby permitting the surface 84 to lap the end face 73 to the desired flatness.

OPERATION

The operation of the device embodying the invention, and the method of manufacturing the improved seal assembly of the invention, will be described in detail hereinbelow for a better understanding thereof.

Considering first the operation of the cutter assembly 14, the rock cutter 21 is freely rotatable relative to the shaft 27 due to the bearings 28 and 29 disposed therebetween. The shaft 27 is in turn fixedly secured relative to the arm 13 and is substantially radially spaced from the rotational axis of the boring head 11. Thus, when the boring head 11 is rotated about its central substantially horizontal axis, this causes the shaft 27 to be rotatably moved about the horizontal rotational axis of the boring head. This also causes the cutter 21 to be rotated about the same axis so that the cutting tip 23 is disposed in rolling engagement with the surrounding soil or rock, whereupon the cutter 21 also rotates about the shaft 27. Rotation of cutter 21 causes the outer bearing race 54 to also rotate therewith, whereupon the seal face 73 will rotatably slide on the seal face 76. However, the sealing engagement between the sliding faces 73 and 76 effectively prevents any contaminating, abrasive and/or corrosive materials or fluids from passing through the spaces 41 or 49. The bearings 28 and 29 are thus substantially isolated from the contaminating, particularly abrasive, environment which exists externally of the cutter assembly 14. The provision of the ceramic layer 74 on the annular seal ring 62 not only results in a desirable sealing engagement between the faces 73 and 76, but also results in a minimum of friction between the faces 73 and 76 to permit free rotation of the cutter 21 relative to the surrounding housing members 33 and 44. The ceramic layer 74 also results in a durable and long wearing seal.

Considering now the manner in which the face 73 of the outer bearing race 54 is lapped to insure the necessary flatness thereof, the bearing race 54 is first pressed into the cutter 21. The resultant subassembly is then positioned on a suitable support surface, such as the table of a conventional drill press. A suitable lapping compound or slurry consisting of a lapping abrasive with a hardness greater than the bearing race 54 and a fluid, such as spindle oil or kerosene, is then applied to the end face 73 so that a light coating of lapping compound is disposed on the entire surface. The lapping tool 81 is then disposed on the race 54 such that the lapping surface 84 is disposed face down on the wetted end face 73. The drive shaft 92 is then inserted into the dril chuck 93 and the chuck 93 is then moved downwardly until the transverse pin 94 is disposed within the transverse radial slot 96. The drill press spindle is then rotated at relatively low speed, such as in the neighborhood of 50 RPM, while a relatively small downward force, such as a force of approximately one-half pound, is applied to the lapping tool to cause the surface 84 to rotatably bear against the end face 73. The lapping tool is then rotated for a substantial period of time, such as in the neighborhood of approximately 2 minutes, whereupon the drill press spindle is stopped and moved upwardly to permit removal of the lapping tool 81 from the face 73. If the end face 73 has no shiny areas, but has a totally dull or matted finish, then sufficient lapping of the surface has been performed and the surface 73 thus has the necessary flatness. On the other hand, if shiny areas appear on the surface 73, then further lapping is required until the desired dull or matted finish appears on the entire surface. After the desired flatness has been achieved and suitably cleaned of any lapping residue, then the remainder of the cutter assembly 14 can be assembled.

While the lapping operation as described above is particularly suitable for use during initial manufacturing and assembly of the cutter assembly 14, it often happens that the race surface 73 must be relapped while the tunneling machine is located at a job site. In this siutation, the lapping tool can be fixedly secured in an upwardly directed position by any conveniently available clamping means, whereupon the subassembly comprising the cutter 21 and the outer race 54 can then be positioned on top of the lapping tool, after first initially wetting the lapping surface 84 with lapping compound. The cutter 21 and the race 54 associated therewith can then be manually oscillated or rotated relative to the lapping tool 81 to permit the desired lapping of the surface 73. When used in this manner, the lapping compound and other contaminating materials will be pushed into the annular groove 86 and will thus not interfere with the proper lapping of the surface 73, even though the tool 81 is disposed with the lapping surface 84 directed upwardly, rather than downwardly.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination, a rock boring cutter assembly including:
    a rotary cutting wheel having an external surface configured to engage and break rock formations;
    mounting means for said cutting wheel including a frame recessed snugly to surround a portion of a side and the ends of said cutting wheel and having a portion adapted to be mounted on the rotary cutter head of a rock boring machine;
    first and second, axially spaced, anti-friction bearing means rotatably supporting said cutting wheel on said frame, each of said anti-friction bearing means including an outer bearing race nonrotatably secured to said cutter wheel and an inner bearing race nonrotatably secured relative to said frame, and a plurality of bearing elements rotatably disposed between and in engagement with said inner and outer bearing races;
    first seal means coacting between one end of said cutting wheel and the adjacent end of said frame for preventing passage of undesired material into said first anti-friction bearing means; and
    second seal means coacting between the other end of said cutting wheel and the other end of said frame for preventing passage of undesired material into said second anti-friction bearing means, said second seal means being substantially identical to said first seal means;
    further comprising the improvement wherein each said seal means includes a nonrotatable seal ring mounted on said frame and having an annular portion of ceramic material secured thereto and defining a transverse ceramic seal face, the adjacent outer race of said anti-friction bearing means having a transverse metallic seal face formed on one axial end thereof, spring means coacting between said frame and said nonrotatable seal ring for axially urging the ceramic seal face of said nonrotatable seal ring into relative rotatable sliding engagement with the metallic seal face formed on said outer bearing race, said nonrotatable seal ring at the end thereof opposite the ceramic seal face having a tapered external configuration, a plate-like retainer disposed in engagement with said nonrotatable seal ring and having an annular tapered flange positioned in engagement with the tapered external periphery of the nonrotatable seal ring, said frame having an axially extending flange portion disposed in surrounding relationship to the tapered flange on said retainer, a resilient cushioning ring disposed between and snugly engaged with said flange portion of said frame and said tapered flange of said retainer, and said spring means including a plurality of coil springs disposed in a circular pattern and positioned axially between said retainer and said frame, said coil springs at one end thereof being disposed within recesses formed in said frame.

2. The combination according to claim 1, wherein said flange portion of said frame and said cutting wheel having axially overlapping lip portions which define a narrow annular clearance space therebetween, said clearance space having a substantially L-shaped cross section, and said seal means being disposed adjacent the radially inner end of said clearance space for preventing material from gaining access to said anti-friction bearing means.

3. The combination according to claim 1, wherein said non-rotatable seal ring adjacent the ceramic seal face has an annular flange integrally formed thereon and extending radially outwardly therefrom, said annular flange having an axial width substantially less than the axial width of said nonrotatable seal ring, said flange extending radially outwardly and being positioned closely adjacent but slightly spaced from the flange portion of said frame, said flange extending radially outwardly so as to at least partially radially overlap said resilient cushioning ring to retain same in position.

* * * * *